(12) United States Patent
Bhorania et al.

(10) Patent No.: US 8,352,492 B2
(45) Date of Patent: Jan. 8, 2013

(54) RETRIEVAL OF METADATA FOR PERIPHERAL DEVICES

(75) Inventors: Aayaz Bhorania, Redmond, WA (US);
Palani Perumal, Redmond, WA (US);
Erik Gubitz, Bellevue, WA (US); Abed Jawad, Kirkland, WA (US); Mitsuru Saito, Redmond, WA (US); Farhan Ahmed, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 12/408,566

(22) Filed: Mar. 20, 2009

(65) Prior Publication Data

US 2010/0241660 A1    Sep. 23, 2010

(51) Int. Cl.
*G06F 17/30* (2006.01)
(52) U.S. Cl. ........................... 707/770; 719/327
(58) Field of Classification Search .................... None
See application file for complete search history.

(56) References Cited

U.S. PATENT DOCUMENTS

| | | | |
|---|---|---|---|
| 6,470,332 B1 | 10/2002 | Weschler | |
| 6,931,450 B2 | 8/2005 | Howard | |
| 7,461,128 B2 | 12/2008 | Anderson | |
| 7,707,142 B1* | 4/2010 | Ionescu | 707/999.003 |
| 2004/0002961 A1* | 1/2004 | Dettinger et al. | 707/3 |
| 2005/0015365 A1* | 1/2005 | Kavacheri et al. | 707/3 |
| 2005/0044063 A1* | 2/2005 | Barsness et al. | 707/2 |
| 2006/0230060 A1* | 10/2006 | Salgado | 707/103 R |
| 2006/0265661 A1* | 11/2006 | Ball | 715/734 |
| 2007/0055574 A1 | 3/2007 | Jensen | |
| 2007/0101342 A1* | 5/2007 | Flegg et al. | 719/321 |
| 2007/0150478 A1 | 6/2007 | Cho | |
| 2008/0033921 A1 | 2/2008 | Arrouye | |
| 2009/0158301 A1* | 6/2009 | Holan et al. | 719/321 |
| 2009/0319660 A1* | 12/2009 | Cavalaris et al. | 709/225 |

OTHER PUBLICATIONS

Zune Privacy Statement; http://privacy.microsoft.com/en-us/zune.aspx, Sep. 2007; downloaded on Mar. 20, 2009.
PNP-X Implementer's Guide; http://download.microsoft.com/download/5/D/6/5D6EAF2B-7DDF-476B-93DC-7CF0072878E6/PnP-X_imp.doc; Apr. 19, 2005; downloaded on Mar. 20, 2009.

(Continued)

*Primary Examiner* — Son T Hoang
*Assistant Examiner* — Michele Choi
(74) *Attorney, Agent, or Firm* — Capitol City TechLaw; Richard C. Irving

(57) ABSTRACT

Techniques whereby a client computer may request metadata relating to a peripheral device from one or more server computers are provided. Upon connecting to a peripheral device, the client computer receives information identifying the device, and generates a query, using the received information, for metadata relating to the device. The client computer may, for example, first attempt to execute the query locally to determine if metadata appropriate for use (e.g., not outdated) is stored on the client computer. If not, the client computer may issue the query to one or more server computers which stores metadata received from manufacturers and/or suppliers of peripheral devices. The one or more server computers may issue a response making the requested metadata available to the client computer and providing instructions relating to subsequent requests from the client computer, so as to manage the processing load borne by the one or more server computers. The client computer may employ the metadata to present a graphical interface that enables the user to manage the device.

17 Claims, 6 Drawing Sheets

OTHER PUBLICATIONS

Device Metadata Package Pipeline; http://download.microsoft.com/download/a/d/f/adf1347d-08dc-41a4-9084-623b1194d4b2/DevMetadataPkgPipe.doc.; Nov. 5, 2008; downloaded on Mar. 20, 2009.

MTP Device Simulator User's Guide http://download.microsoft.com/download/a/d/f/adf1347d-08dc-41a4-9084-623b1194d4b2/MTPTS_Guide.docx; Nov. 5, 2008; downloaded Mar. 20, 2009.

U.S. Appl. No. 12/002,060, filed Dec. 14, 2007, Holan et al.

U.S. Appl. No. 12/143,194, filed Jun. 20, 2008, Cavalaris et al.

* cited by examiner

RETRIEVAL OF METADATA FOR PERIPHERAL DEVICES

FIELD OF THE INVENTION

This invention relates generally to computer software, and more particularly to the retrieval and use of software enabling a computer to interoperate with one or more peripheral devices.

BACKGROUND

In conventional arrangements, when a peripheral device is connected to a client computer, the client computer may receive information from the peripheral device which includes one or more hardware identifiers. In general, a hardware identifier identifies a function performed by the peripheral device. If the peripheral device is a multi-function device, such as a printer/scanner/fax machine, the client computer may receive one or more hardware identifiers identifying the print function, one or more other hardware identifiers identifying the scan function and one or more other hardware identifiers identifying the fax function. When the client computer receives the hardware identifier(s) from the device, the client computer uses the identifier(s) to identify a driver enabling the client computer to interoperate with and employ functions provided by the peripheral device.

More than one hardware identifier may be provided for each function, because there may be more than one driver which will allow the client computer to employ a particular function. For example, many device manufacturers typically supply multiple drivers for a given device function, with one driver being very specific to the function, and others being more generic. More generic drivers typically may be used by a client computer to employ functions provided by any of multiple devices (or families of devices), but may not allow the client computer to employ all of the aspects of a given device function. For example, the manufacturer of a monitor may include one driver that enables a client computer to employ all of the display functionality provided by the monitor, and several more generic drivers that do not enable the client computer to employ all of this functionality, but allow the client computer to interoperate with any of several monitors.

Typically, hardware identifiers for a given function are provided to a client computer in a sequence which ranges from most specific to most generic. That is, for each function performed by the device, the client computer receives a sequence ranging from the most specific hardware identifier to the most generic. If the device is a multi-function device, the hardware identifiers for each individual function conform to this sequence. Thus, if a device has two functions, and two hardware identifiers are provided by the device for each function, the client computer receives two groups of two identifiers each, with each group arranged in a sequence from most specific to most generic. When the hardware identifiers are received, the client computer attempts to match the hardware identifiers in each group in sequence (from most specific to least specific) with a driver (e.g., stored on the client computer). When a particular hardware identifier does not match a driver, the client computer proceeds with trying to match the next hardware identifier in sequence in the group. Once a matching driver is found for a group, the client computer may employ the function represented by identifiers in the group.

This processing is illustrated conceptually in FIG. 1, in which device 101 is connected to client computer 102 via link 120. Device 101 includes hardware identifiers 105, which are provided to client computer 102 when device 101 is connected thereto, and are employed by matching facility 110 (which may be a portion of an operating system executing on client computer 102) to retrieve one or more drivers. Hardware identifiers 105 include identifiers for each of three different functions, with the first digit in each identifier following the letter "H" identifying the function. For example, hardware identifiers H11 and H12 correspond to a first function, H21, H22 and H23 correspond to a second function, and H31 corresponds to a third function. The identifiers for each function are arranged in a sequence from most specific to most generic, with the second digit in each identifier following the letter "H" identifying a level of specificity. Thus, hardware identifier H11 for the first function is more specific than is H12, and hardware identifier H22 for the second function is more specific than is H23.

When device 101 is connected to client computer 102, matching facility 110 receives the hardware identifiers for each function in sequence, and attempts to match each hardware identifier for a given function in turn to a driver stored in storage facility 115. For example, for hardware identifiers relating to the first function, matching facility 110 first attempts to match identifier H11 to a driver stored in storage element 115, and if no match is found, proceeds to try to match identifier H12. Similarly, matching facility 110 attempts to match identifiers for the second function (i.e., H21, H22 and H23) and for the third function (i.e., H31) to a driver in storage facility 115. When a matching driver is found for any function, client computer 102 employs the corresponding function as defined by the driver.

Because each hardware identifier provided by a peripheral device relates to a function performed by the device, rather than the device itself, a client computer that receives hardware identifiers corresponding to multiple functions (such as might be supplied by a multi-function device) "perceives" the device as multiple distinct entities (i.e., one entity for each function defined by a set of hardware identifiers). For example, when a multi-function device such as a printer/scanner/fax machine provides hardware identifiers for its functions to a client computer, the client computer perceives the device as three entities, providing print, scan and fax capabilities, respectively.

BRIEF SUMMARY OF THE INVENTION

Applicant has appreciated that the information provided by a peripheral device (i.e., any device attached to a client computer to provide functionality, such as a printer, disk drive, microphone, camera, cellular telephone, media player, microphone, etc.) to a client computer (a term used herein for convenience, and intended to include any computing device, such as a desktop computer, laptop computer, personal digital assistant, cellular telephone, other computing device, or any combination thereof) may be used to not only identify specific functions performed by the peripheral device, but also may be used to retrieve metadata relating to the device. This metadata may be used, for example, by the client computer to present an interface which includes information about the device and enables the user to configure the device. The interface may provide a rich and meaningful user experience with respect to the device, such as by allowing the user to view information about the device and to manage relationships between individual functions. Metadata may include, as examples, one or more graphical illustrations of the device, the manufacturer's name, information about the device's features, and/or available user configuration tasks and various parameters relating to these tasks.

Some embodiments of the invention provide techniques whereby metadata may be retrieved and employed by a client computer for interoperation with a peripheral device. For example, in some embodiments, a metadata retrieval client executing on a client computer may communicate with a metadata information service executing on one or more server computers. The metadata retrieval client may retrieve metadata stored locally on the client computer and/or from the metadata information service based on information received from the peripheral device. For example, a metadata retrieval client, upon receiving information from a device, may construct a query which includes the information, and execute the query locally to determine whether appropriate metadata for the device is stored on the client computer. If not (e.g., if there is no matching metadata on the client computer, or the metadata stored locally is outdated or stale), the metadata retrieval client may attempt to retrieve appropriate metadata from a metadata information service. Information transmitted by the metadata information service may include not only requested metadata, but also information which may be processed by the metadata retrieval client to control or influence its subsequent actions, such as subsequent attempts to communicate with the metadata information service. When appropriate metadata is located, either locally or remotely, the client computer may employ it to present a user interface to a user.

The foregoing is a non-limiting summary of the invention, which is defined by the attached claims.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In accordance with some embodiments of the invention, information received by a client computer from a peripheral device, such as one or more hardware identifiers, one or more other identifiers, and/or other information, may be used to retrieve metadata relating to the device. The metadata may be employed by a client computer to provide the user with a rich and meaningful experience in interacting with the device, and may include, as examples, a photograph and/or graphical illustration of the device, information on one or more available configuration tasks, the device's or manufacturer's name, and/or other information. The metadata may be retrieved by a metadata retrieval client (MRC) executing on the client computer, either from a data store maintained locally or from a metadata information service (MIS) on one or more server computers. If provided by an MIS, the information may also include instructions and/or parameters that may guide or control the subsequent operation of the MRC. For example, the information may include instructions and/or parameters defining whether or how frequently an MRC issues a query to an MIS in the future.

Metadata may, for example, be provided by a manufacturer or supplier of the device to the MIS, and upon retrieval by the client computer may be stored on the client computer, or any other easily accessible component, so that the metadata can be subsequently retrieved without requiring communication with a server computer. Of course, the invention is not limited to such an implementation, as metadata may be retrieved from a server computer dynamically each time a device is connected to the client computer, or in any other suitable manner. Some example techniques are described below.

Figure 2:
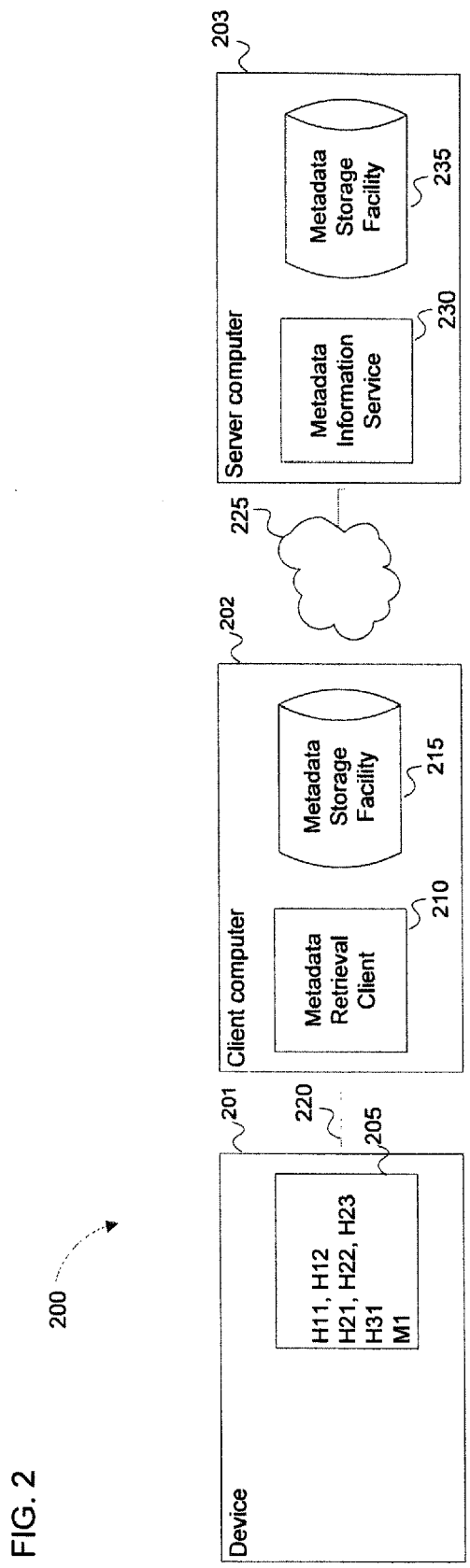
FIG. 2 is a block diagram depicting an example system for retrieving metadata relating to a peripheral device using information provided by the device, according to some embodiments of the invention.

FIG. 2 depicts a system 200 which enables information provided by a device 201 to a client computer 202 to be used to retrieve metadata about the device. In the example of FIG. 2, device 201, which may be any suitable peripheral device providing one or more functions, stores information 205. Device 201 is connected to client computer 202 via link 220, which may comprise any suitable communications media, such as a Universal Serial Bus (USB) link. Client computer 202 executes metadata retrieval client 210, which may comprise any one or more bodies of programmed instructions, such as stand-alone programs and/or modules, instructions incorporated into one or more other programs and/or modules (e.g., an operating system executing on client computer 202), or implemented in any other suitable fashion. Metadata retrieval client (MRC) 210 accesses metadata storage facility 215, which may comprise any one or more data structures.

In the example system 200, client computer 202 communicates with server computer 203 via network(s) 225, which may comprise, for example, the Internet, a LAN, a WAN and/or any other wired or wireless network, or combination thereof. It should be appreciated that server computer 203 need not be a separate computer from client computer 201, and may, as an example, comprise programmed instructions which execute on client computer 201.

Metadata information service (MIS) 230 executes on server computer 203 and accesses metadata storage facility 235. As with MRC 210, MIS 230 may comprise any one or more bodies of programmed instructions implemented in any other suitable fashion. Similarly, like metadata storage facility 215, metadata storage facility 235 may comprise any one or more data structures. Metadata storage facility 215 and metadata storage facility 235 may include the same metadata, different metadata, or metadata which overlaps in part. The invention is not limited to any particular system implementation.

The metadata stored in either or both of metadata storage facility 215 and metadata storage facility 235 may, for example, be supplied by a manufacturer or supplier of a device to which such metadata relates. For example, a manufacturer or supplier of a device may supply metadata relating to the device to metadata storage facility 235, which then provides it to MRC 210 (e.g., using the process described below with reference to FIG. 3), which may then store it in metadata storage facility 215 to supplement metadata previously stored in metadata storage facility 215. Of course, metadata may be provided to metadata storage facility 215 and/or metadata storage facility 235 in any suitable manner, as embodiments of the invention are not limited in this respect.

Figure 1:
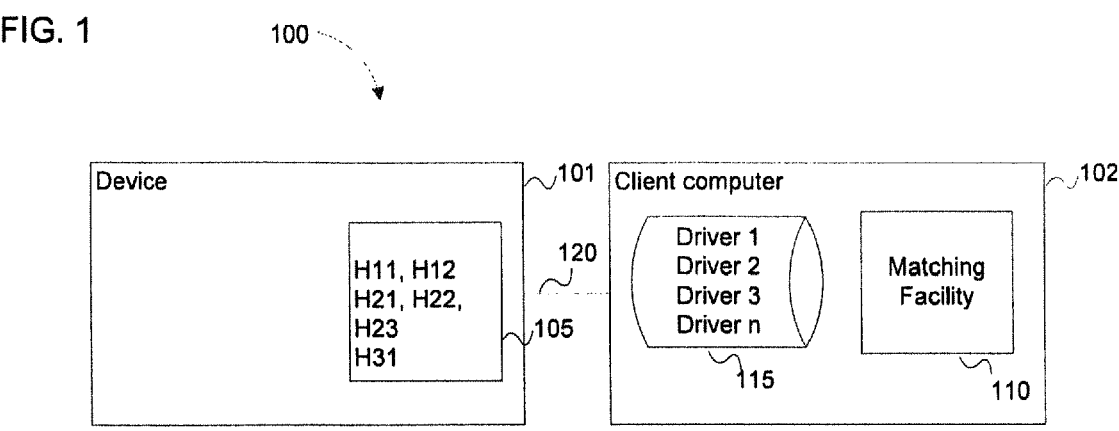
FIG. 1 is a block diagram depicting an example technique for matching hardware identifiers provided by a peripheral device to drivers on a client computer, according to the prior art.

In the example shown in FIG. 2, information 205 includes the hardware identifiers described above with reference to FIG. 1 (i.e., identifiers H11, H12, H21, H22, H23 and H31), and an additional identifier which is referred to herein for convenience as a model identifier. In some embodiments, a model identifier may be unique to a particular peripheral device, although the invention is not limited to such an implementation. For example, in some embodiments a model identifier may be unique to a device and provider, such that multiple providers may each provide a unique model identifier for the device. This may be useful for devices such as cellular telephones, where a single device may be offered for sale by multiple network service providers. Using a model identifier unique to a device and provider may allow each provider or manufacturer to furnish different metadata for the device, which may be used to present different interfaces (e.g., to perform different configuration tasks, provide different information about the device, etc.).

As described above with reference to FIG. 1, the hardware identifiers included in information 205 are arranged so that the identifiers for each function that are more specific to the device (e.g., H11, H21) precede others that are more generic (e.g., H12, H22, H23). In accordance with some embodiments of the invention, hardware identifiers are further arranged so that a specific identifier and/or function which is deemed most representative of the device overall precedes all other identifiers and/or functions. For example, a device supplier or manufacturer may designate a specific hardware identifier (e.g., H11) to be used to retrieve metadata relating to the device. For example, if device 201 provides print, scan and fax functions, a manufacturer of the device may designate that identifier H11, representing the print function, should be used to retrieve metadata for device 201 overall, and may arrange the hardware identifiers so that identifier H11 precedes all others in information 205.

Figure 3:
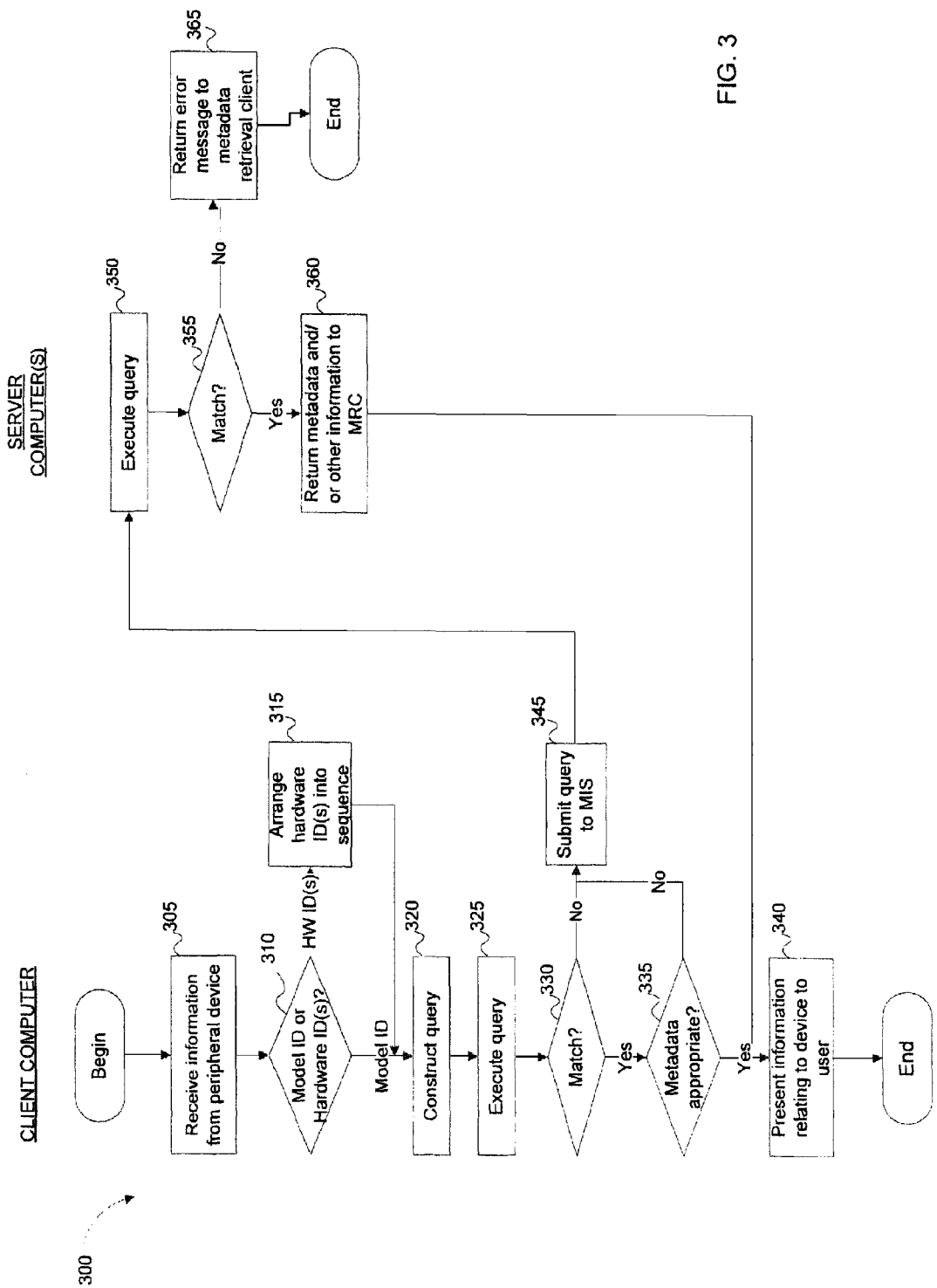
FIG. 3 is a flowchart depicting an example process for retrieving metadata relating to a peripheral device using information provided by the device, according to some embodiments of the invention.

When device 201 is connected to client computer 202 via link 220, or when a user issues a request for metadata (e.g., via a component such as the "Devices and Printers" folder in the Windows 7 Operating System, offered by Microsoft Corp. of Redmond, Wash.), MRC 210 may employ the example process 300 shown in FIG. 3 to receive information 205 from the device and use this information to retrieve metadata for the device.

At the start of process 300, information 205 is received by MRC 210 in act 305. Information may be provided to MRC 210 via any one or more direct links (e.g., a USB, FireWire or other link), networks (e.g., one or more wired or wireless networks, such as an ad hoc network between a device and client computer), or other connections. The invention is not limited to any particular implementation.

In act 310, MRC 210 determines whether the information received from the device includes a model identifier or one or more hardware identifiers. This determination may be made in any suitable fashion, such as by executing programmed instructions to identify any model identifier or hardware identifier(s) from among information received from the device.

If it is determined in act 310 that the information includes one or more hardware identifiers, the process proceeds to act 315, wherein the hardware identifier(s) are arranged into a sequence. One exemplary manner of arranging hardware identifiers into a sequence is illustrated conceptually in FIG. 4.

Figure 4:
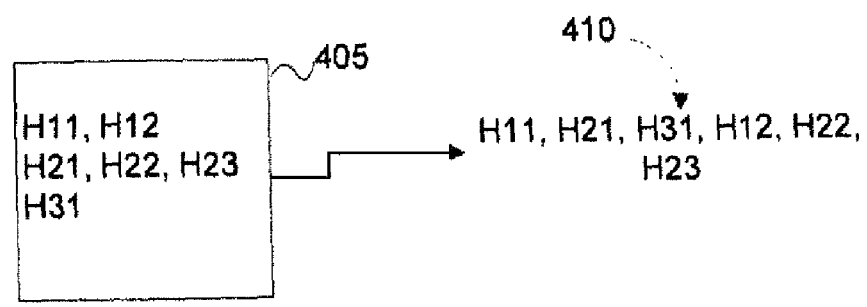
FIG. 4 is a block diagram illustrating a technique for arranging information received from a peripheral device into a sequence, according to some embodiments of the invention.

In the example of FIG. 4, hardware identifiers 405, which include identifiers the H11, H12, H21, H22, H23 and H31 described above with reference to FIG. 1, are arranged into a sequence such that identifiers that are most specific to the device for any function precede other identifiers that are more generic. Thus, in this example, hardware identifiers are arranged into the sequence H11, H21, H31, H12, H22, H23. However, it should be appreciated that hardware identifiers, or any other information received from a device, may be arranged into any suitable sequence, and that embodiments of the invention are not limited to any particular implementation.

Upon the completion of act 315, or if it is determined in act 310 that the information received from the multi-function device includes a model identifier, process 300 proceeds to act 320, wherein a query employing the information is constructed. In some embodiments, the query specifies a query type (e.g., whether a model identifier or one or more hardware identifiers are specified in the query), a locale (e.g., the location of the client computer, which may be used to determine the language in which metadata should be provided), either the model identifier or hardware identifier(s) received from the device, and a stamp date indicating when metadata stored on the client computer was last updated. Thus, in one example, a query resulting from act 320 could be:
type=hwid, lang=en-us, hwids=H11, H21, H31, H12, H22, H23, LastStampDate=20070801

After the query is constructed, example process 300 then proceeds to act 325, wherein the query is executed by MRC 210. In some embodiments, MRC 210 may attempt to match the model identifier or hardware identifier(s) provided in the query with metadata stored locally on the client computer (e.g., in metadata storage facility 215). If more than one hardware identifier is specified in the query, the metadata retrieval facility may attempt to match each hardware identifier in sequence to metadata, so as to attempt to retrieve metadata that is most specific to the device. However, embodiments of the invention are not limited to such an implementation, as matching may be performed in any suitable manner.

The process then proceeds to act 330, where a determination is made whether a match is found. In some embodiments, only one matching item of metadata is needed to support a determination that a match has been found. Further, in some embodiments, even if more than one item of metadata matches identifiers specified in the query, only one item of metadata is retrieved. For example, assume that the metadata stored in metadata storage facility 215 includes the following two items:
Metadata A:
Function=mf
Match1=h11
Match2=h782
Lang=en-us
LastStampDate=20070811
Metadata B:
Function=mf
Match1=h31
Lang=en-us
LastStampDate=20070815

In this example, because the metadata retrieval facility attempts to match each hardware identifier in sequence to metadata items, even though both items of metadata include hardware identifiers that match those specified in the query (i.e., identifiers H11 and H31), only metadata A is determined to be the matching item and retrieved.

If it is determined in act 330 that a match is found, the process proceeds to act 335, wherein a determination is made whether the matching item of metadata is appropriate for use.

Any of numerous considerations may drive this determination, such as whether the item of metadata is outdated (e.g., determined using an indication of the date and time at which the item of metadata was last updated or downloaded). For example, if a matching metadata item is older than a predetermined age (e.g., one month), a determination may be made that it is outdated. Of course, whether or not an item of metadata is outdated is only one of numerous considerations that may drive a determination that metadata is, or is not, appropriate for use, and any or all of such considerations may influence the determination. Embodiments of the invention are not limited in this respect.

If it is determined in act 335 that the metadata item is appropriate for use, it may be processed by one or more software routines (e.g., implemented by the metadata retrieval client, or other routines) to present a graphical interface to a user of client computer 202 in act 340. For example, a graphical interface may present information about the device, and one or more available tasks which the user may perform to configure the device. Process 300 then completes.

If it is determined in act 335 that the metadata is not appropriate for use, or if it is determined in act 330 that no match is found locally, then process 300 proceeds to act 345, wherein the query constructed in act 320, and/or parameters thereof, may be submitted to a metadata information service executing on one or more server computers (e.g., MIS 230, FIG. 2). The query and/or parameters may be transmitted to the MIS in any suitable fashion, as embodiments of the invention are not limited in this respect. For example, the query and/or parameters may be included in a request communicated using the SOAP protocol having embedded XML data identifying the query and/or parameters.

An example XML schema for a request is shown as Example 1 below:

EXAMPLE 1

```
<xs:complexType name="DMRequestHeaderSchema">
<xs:sequence>
    <xs:element name="cv" type="xs:string" />
</xs:sequence>
</xs:complexType>
```

Sample data for this request is shown as Example 2 below. In Example 2, the field name for the element "cv" defined in the schema shown in Example 1 is "ClientVersion."

EXAMPLE 2

```
<DMRequestHeader>
<cv>7.0</cv>
<DMRequestHeader>
```

Of course, it should be appreciated that the sample XML schema in Example 1 and sample data in Example 2 are merely exemplary, and that any schema, defining any suitable field(s) and/or element(s), may be employed. For example, a schema may define fields such as a request identifier, model identifier, hardware identifier, locale, and/or date of submission for a previous request, and date for these and/or other fields may be provided in a request header like that shown in Example 2. Any suitable number and/or type of fields and/or elements may be defined in a schema implemented in accordance with embodiments of the invention. Further, a schema may be defined using any suitable language, including but not limited to a markup language such as XML, as embodiments of the invention are not limited in this respect.

It should also be appreciated that embodiments of the invention are not limited to sending the query constructed in act 320 (i.e., intended for execution on the client computer) to a metadata information service in act 345, as any query and/or request may be generated and/or transmitted to the metadata information service. Embodiments of the invention are not limited to any particular implementation.

An example parameter which may be specified in a query transmitted in act 345 is the locale of the client computer. In this respect, it should be appreciated that many operating systems are distributed in a number of different countries, with a different version for each country. Thus, the locale parameter may specify the language in which one or more portions of metadata is provided.

In act 350, the query is executed by the MIS. Execution may be performed in much the same way as in act 325, except that the MIS may execute the query against a metadata storage facility kept on one or more server computers, or storage locations accessible thereto, instead of the MRC executing the query against a local metadata storage facility. Of course, the invention is not limited to any particular implementation, as a query may be executed in any suitable fashion, against any number of metadata storage facilities kept in any one or more storage locations.

In act 355, a determination is made whether a match is found. This determination may, for example, be made by the metadata information service in much the same manner as in act 330 by the metadata retrieval client, described above, or in any other suitable fashion.

In some embodiments, the metadata information service may maintain items of metadata for more than one locale, so that a determination whether a match is found may employ the locale parameter provided in act 345. For example, if a query and/or parameters passed in act 345 specify a particular model ID and locale, and it is determined in act 355 that a metadata item exists for the specified model ID but not the locale, then it may be determined that a match is not found. Of course, embodiments of the invention are not limited to such an implementation. For example, in some embodiments, a "default" locale may be designated (e.g., by the metadata information service), so that if no matching metadata item is found for the model ID and locale specified in the query and/or parameters passed in act 345, but a matching metadata item is found for the model ID with the designated default locale, then it may be determined that a match is found. Embodiments of the invention may be implemented in any of numerous ways.

If no match is found, an error message is returned to the metadata retrieval client in act 365, so that, for example, the metadata retrieval client may display an indication that no metadata could be located to the user of the client computer. Of course, no such indication need be given to the user, and any suitable processing may be performed.

If a match is found in act 355, a response including the matching metadata and/or other information is transmitted to the metadata retrieval client in act 360. The response may be communicated in any suitable fashion, such as via network 225 using the SOAP protocol having embedded XML. An example XML schema for a response header in shown in Example 3 below.

EXAMPLE 3

```
<xs:complexType name="DMResponseHeaderSchema">
<xs:sequence>
        <xs:element name="ClientConfiguration"
        type=" DMClientConfigSchema" />
</xs:sequence>
</xs:complexType>
```

The sample schema for a response header shown in Example 3 defines an element name "ClientConfiguration" which in turn is defined by the example "DMClientConfigSchema" XML schema shown in Example 4 below.

EXAMPLE 4

```
<xs:complexType name="DMClientConfigSchema">
<xs:sequence>
        <xs:element name="cmdr" type="xs:int" minOccurs="1"
        maxOccurs="1"/>
        <xs:element name="cmdnr" type="xs:int" minOccurs="1"
        maxOccurs="1"/>
        <xs:element name="rbs" type="xs:int" minOccurs="1"
        maxOccurs="1"/>
        <xs:element name="boi" type="xs:int" minOccurs="1"
        maxOccurs="1"/>
</xs:sequence>
        </xs:complexType>
```

The example "DMClientConfigSchema" schema shown in Example 4 defines parameters, in the form of XML elements, which may influence the subsequent operation of the metadata retrieval client (e.g., subsequent communications between the metadata retrieval client and metadata information service). Specifically, the schema shown in Example 4 defines elements "cmdr" (which, in this example, defines a number of days that the client should wait before querying for metadata for a device in the event metadata was found in act 355), "cmdnr" (in this example, a number of days that the client should wait before querying for metadata for a device in the event metadata was not found in act 355), "boi" (in this example, a time interval that should elapse before the client sends any additional requests to the metadata information service), and "rbs" (in this example, a maximum number of queries that a request may include). Other parameters may additionally, or alternatively, be defined, as embodiments of the invention are not limited in this respect.

Sample data for a response is shown in Example 5 below.

EXAMPLE 5

```
<DMResponseHeader>
<cc>
        <cmdr>7</cmdr>
        <cmdnr>5</cmdnr>
        <rbs>10</rbs>
        <boi>30</boi>
</cc>
<DMResponseHeader>
```

Upon receiving a response including the parameters shown in Example 5, a metadata retrieval client may process the parameters to alter the manner in which requests are subsequently sent to the metadata information service. For example, given the value of "7" for the "cmdr" element, the metadata retrieval client may wait seven days before querying for metadata for a device in the event metadata was found in act 355. Given a value of "5" for the "cmndr" element, the metadata retrieval client may wait five days before querying for metadata for a device in the event metadata was not found in act 355. Given a value of "10" for the "rbs" element, the metadata retrieval client may subsequently include ten queries in any subsequent request. Given a value of "30" for the "boi" element, the metadata retrieval client may wait thirty minutes before sending any additional requests to the metadata information service.

In some embodiments, a response received from the metadata information service may include the metadata itself, or may specify a location (e.g., using a uniform resource locator, or URL) from which the metadata may be downloaded by the client. For example, the URL may include a network location and an identifier for an identified item of metadata. Any of numerous techniques may be employed to send metadata to the client, or to enable the client to download metadata, as embodiments of the invention are not limited to any particular implementation.

Upon the completion of act 360, process 300 then proceeds to act 340 (described above), and then completes.

It should be appreciated that process 300 is merely an example process that may be employed to retrieve metadata, and that any of numerous variations or modifications are possible. For example, a process for retrieving metadata may include other acts than those described above, may omit one or more of the acts described above, or may not perform the acts described above in the sequence prescribed by FIG. 3. Any of numerous variations or modifications are possible, as the invention is not limited to any particular implementation.

Figure 5:
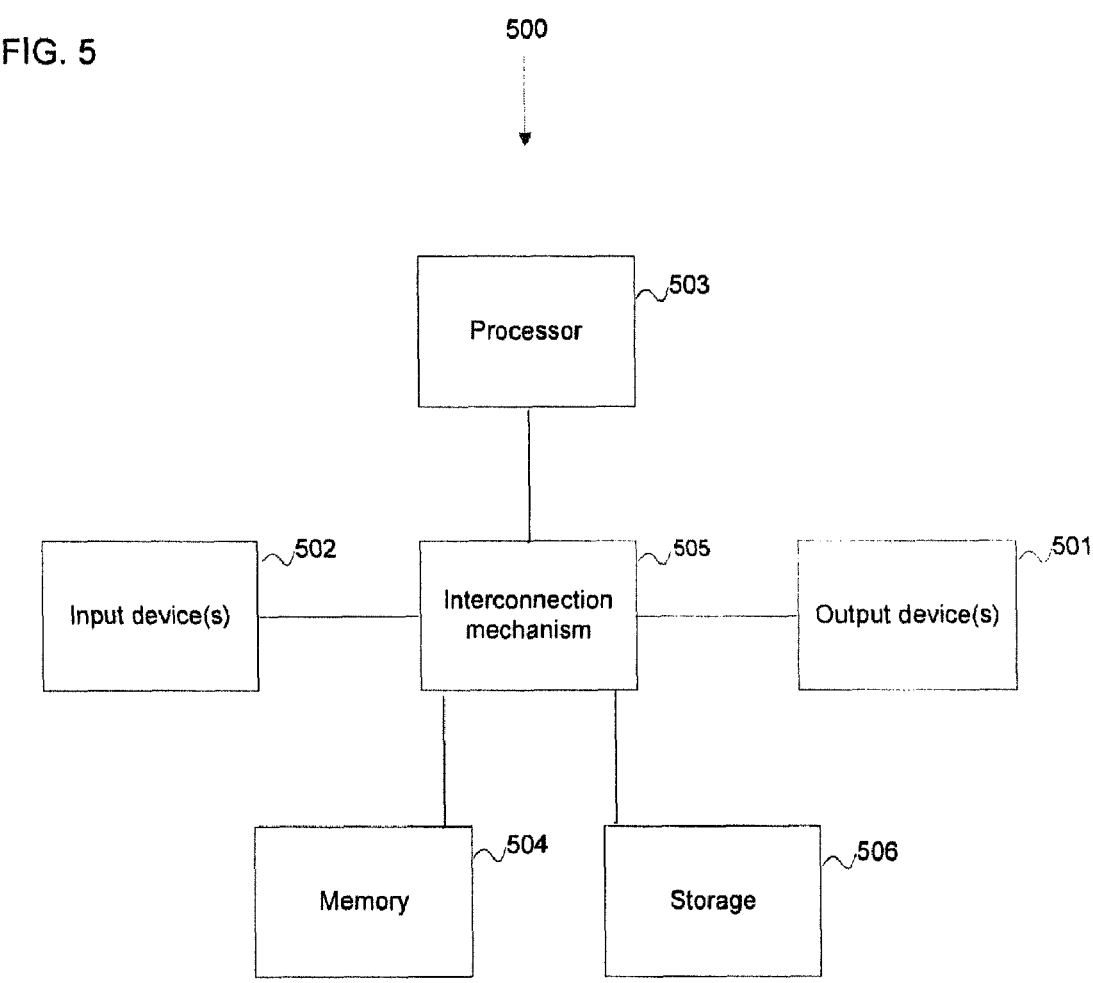
FIG. 5 is a block diagram depicting an example computer system on which some embodiments of the invention may be implemented.

Various aspects of the systems and methods for practicing features of the invention may be implemented on one or more computer systems, such as the exemplary computer system 500 shown in FIG. 5. Computer system 500 includes input device(s) 502, output device(s) 501, processor 503, memory system 504 and storage 506, all of which are coupled, directly or indirectly, via interconnection mechanism 505, which may comprise one or more buses, switches, networks and/or any other suitable interconnection. The input device(s) 502 receive(s) input from a user or machine (e.g., a human operator), and the output device(s) 501 display(s) or transmit(s) information to a user or machine (e.g., a liquid crystal display). The processor 503 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

The processor 503 may also execute one or more computer programs to implement various functions. These computer programs may be written in any type of computer program language, including a procedural programming language, object-oriented programming language, macro language, or combination thereof. These computer programs may be stored in storage system 506. Storage system 506 may hold information on a volatile or non-volatile medium, and may be fixed or removable. Storage system 506 is shown in greater detail in FIG. 6.

Figure 6:
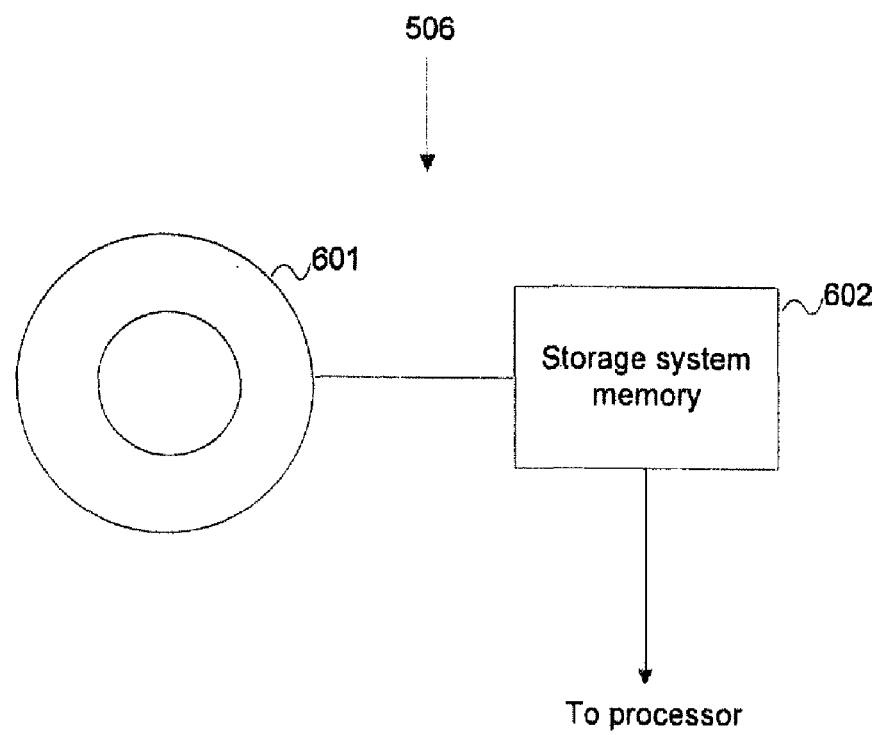
FIG. 6 is a block diagram depicting an example memory on which instructions embodying aspects of the present invention may be stored.

Storage system 506 typically includes a computer-readable and writable nonvolatile recording medium 601, on which signals are stored that define a computer program or information to be used by the program. A medium may, for example, be a disk or flash memory. Typically, an operation, the processor 503 causes data to be read from the nonvolatile recording medium 601 into a volatile memory 602 (e.g., a random access memory, or RAM) that allows for faster access to the information by the processor 503 than does the medium 601. The memory 602 may be located in the storage system 506, as shown in FIG. 6 FIG. 5, or in memory system 504, as shown in FIG. 5. The processor 503 generally manipulates the data within the integrated circuit memory 504, 602 and then copies the data to the medium 601 after processing is completed. A variety of mechanisms are known for managing data movement between the medium 601 and the integrated circuit memory element 504, 602, and the invention is not limited thereto. The invention is also not limited to a particular memory system 504 or storage system 506.

Having thus described several aspects of at least one embodiment of this invention, it is to be appreciated that various alterations, modifications, and improvements will readily occur to those skilled in the art. Such alterations, modifications and improvements are intended to be part of this disclosure, and are intended to be within the spirit and scope of the invention. Accordingly, the forgoing description and drawings are by way of example only.

Further, it should be appreciated that a (client or server) computer may be embodied in any of a number of forms, such as a rack-mounted computer, a desktop computer, a laptop computer, or a tablet computer. Additionally, a (client or server) computer may be embedded in a device not generally regarded as a computer but with suitable processing capabilities, including a Personal Digital Assistant (PDA), a smart phone or any other suitable portable or fixed electronic device.

Also, a (client or server) computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface including keyboards, and pointing devices, such as mice, touch pads, and digitizing tables. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. Also, the various methods or processes outlined herein may be coded as software that is executable on one or more processors that employ any one of a variety of operating systems or platforms.

Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer-readable medium (or multiple computer readable media) (e.g., a computer memory, one or more floppy disks, compact disks, optical disks, magnetic tapes, flash memories, circuit configurations in Field Programmable Gate Arrays or other semiconductor devices, or other computer storage media) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be provided in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. At least one nonvolatile recording medium having instructions encoded thereon which, when executed by a client computer in a system also comprising at least one network and at least one server computer coupled to the client computer via the at least one network, perform a method comprising acts of:
   (A) after connection to a peripheral device, receiving information from the peripheral device that identifies the peripheral device, the information that identifies the peripheral device comprising one or more of a model identifier and one or more hardware identifiers associated with the peripheral device;

(B) generating a first query specifying the information that identifies the peripheral device, the first query requesting metadata relating to the peripheral device;

(C) issuing the first query to the at least one server computer via the at least one network;

(D) receiving a response from the at least one server computer which specifies at least one network address of the metadata relating to the peripheral device, and which includes information regarding a subsequent communication between the client computer and the at least one server computer, the information regarding the subsequent communication further including a time interval that is to elapse before the client computer issues a next query to the at least one server computer requesting the metadata relating to the peripheral device, the time interval included in the information regarding the subsequent communication having a first value when the metadata relating to the peripheral device is found and a second value when the metadata relating to the peripheral device is not found, wherein the second value is different from the first value;

(E) retrieving the metadata relating to the peripheral device at the at least one network address specified in the response; and (F) employing the metadata relating to the peripheral device to present a user interface, the user interface enabling a user of the client computer to configure the peripheral device.

2. The at least one nonvolatile recording medium of claim 1, wherein the act (C) comprises:

(C1) processing the first query to determine whether appropriate metadata relating to the peripheral device is stored locally by the client computer; and (C2) when it is determined in (C1) that the appropriate metadata relating to the peripheral device is not stored by the client computer, then issuing the first query to the at least one server computer via the at least one network.

3. The at least one nonvolatile recording medium of claim 2, wherein the act (C1) comprises processing the first query to determine whether the appropriate metadata that is stored locally by the client computer is not outdated.

4. The at least one nonvolatile recording medium of claim 1, further comprising an act of (G) processing the information regarding the subsequent communication between the client computer and the at least one server computer, the processing resulting in a restriction of one or more subsequent communications from the client computer to the at least one server computer.

5. The at least one nonvolatile recording medium of claim 4, wherein the information regarding the subsequent communication between the client computer and the at least one server computer comprises at least one parameter specifying one or more of a period that will elapse before the client computer issues the next query for subsequent metadata relating to the peripheral device, a period which will elapse before the client computer attempts to communicate with the at least one server computer, a limit on a number of attempts the client computer will make to retrieve the subsequent metadata relating to the peripheral device when an error occurs, and a maximum number of queries that will be included in a communication sent by the client computer to the server computer.

6. At least one server computer, coupled to a client computer via at least one network, the at least one server computer comprising:

at least one storage facility storing metadata relating to one or more peripheral devices; and at least one processor programmed to:

(A) receive a first query from the client computer via the at least one network, the first query including information received from a first peripheral device after the client computer connects to the first peripheral device, the information comprising one or more of a model identifier and one or more hardware identifiers associated with the first peripheral device;

(B) process the first query and retrieve, from the at least one storage facility, metadata relating to the first peripheral device using the information identifying the first peripheral device included in the first query; and (C) issue a response to the client computer via the at least one network specifying at least one network address of the metadata relating to the first peripheral device or the metadata relating to the first peripheral device, and which includes information regarding a subsequent communication between the client computer and at least one server computer, the information regarding the subsequent communication further including a time interval that is to elapse before the client computer issues a next query to the at least one server computer for the metadata relating to the first peripheral device, the time interval included in the information regarding the subsequent communication having a first value when the metadata relating to the first peripheral device is found and a second value when the metadata relating to the first peripheral device is not found, wherein the second value is different from the first value, and wherein the metadata relating to the first peripheral device is usable by the client computer to present a user interface that enables a user of the client computer to configure the first peripheral device.

7. The at least one server computer of claim 6, wherein the at least one processor is programmed to issue a response which includes the metadata relating to the first peripheral device.

8. The at least one server computer of claim 6, wherein the at least one processor is programmed to issue a response which includes information that, when processed by the client computer, controls a subsequent operation of the client computer.

9. The at least one server computer of claim 8, wherein the information regarding the subsequent communication between the client computer and the at least one server computer comprises at least one parameter specifying one or more of a period that will elapse before the client computer issues the next query for subsequent metadata relating to the peripheral device, a period which will elapse before the client computer attempts to communicate with the at least one server computer, a limit on a number of attempts the client computer will make to retrieve the subsequent metadata relating to the peripheral device when an error occurs, and a maximum number of queries that will be included in a communication sent by the client computer to the at least one server computer.

10. The at least one server computer of claim 6, wherein the at least one storage facility stores the metadata relating to the one or more peripheral devices for client computers in a plurality of locales, the first query specifies a locale for the client computer, and processing the first query comprises retrieving the metadata relating to the first peripheral device for a particular locale.

11. The at least one server computer of claim 10, wherein one of the plurality of locales is designated as a default locale, and wherein the at least one processor is further programmed to process the first query by retrieving the metadata relating to the first peripheral device for the default locale when the metadata relating to the first peripheral device for the specified locale is not stored by the at least one storage facility.

12. A method implemented by at least one server computer in a system also comprising a client computer and at least one network, the at least one server computer is coupled to the client computer via the at least one network, the method comprising acts of:

(A) receiving a request from the client computer via the at least one network, the request is for metadata relating to a peripheral device connectable to the client computer and includes information received from the peripheral device after the client computer connects to the peripheral device, the information comprising one or more of a model identifier and one or more hardware identifiers associated with the peripheral device;

(B) processing the request and retrieving the metadata relating to the peripheral device using the information which identifies the peripheral device; and (C) issuing a response to the client computer via the at least one network, specifying at least one network address of the metadata relating to the peripheral device or the metadata relating to the peripheral device, and which includes second information regarding subsequent communications from the client computer to the at least one server computer, the second information including a time interval that is to elapse before the client computer issues a next request to the at least one server computer for the metadata relating to the peripheral device, the time interval having a first value when the metadata relating to the peripheral device is found and a second value when the metadata relating to the peripheral device is not found, wherein the second value is different from the first value, and wherein the metadata relating to the peripheral device is used by the client computer to present a user interface that enables a user of the client computer to configure the peripheral device.

13. The method of claim 12, further comprising an act, performed prior to the act (A), of receiving metadata relating to one or more peripheral devices comprising the peripheral device to which the request for the metadata relating to the peripheral device received in the act (A) relates.

14. The method of claim 13, wherein the metadata relating to the one or more peripheral devices is received from a manufacturer or supplier of the one or more peripheral devices.

15. The method of claim 12, wherein the act (C) further comprises issuing a response which comprises at least one parameter that, when processed by the client computer, causes the client computer to not issue communications to the at least one server computer unless a condition is satisfied.

16. The method of claim 15, wherein the condition relates to a period of time elapsing after the response is received by the client computer.

17. The method of claim 15, wherein the condition relates to a number of requests for the metadata relating to the peripheral device sent by the client computer to the at least one server computer.

* * * * *